B. HOLT.
TRACTION ENGINE.
APPLICATION FILED DEC. 24, 1908.

945,538.

Patented Jan. 4, 1910.
3 SHEETS—SHEET 1.

Witnesses;
F. E. Maynard.
Hosberg.

Inventor,
Benjamin Holt,
By Geo. H. Strong.
His Atty.

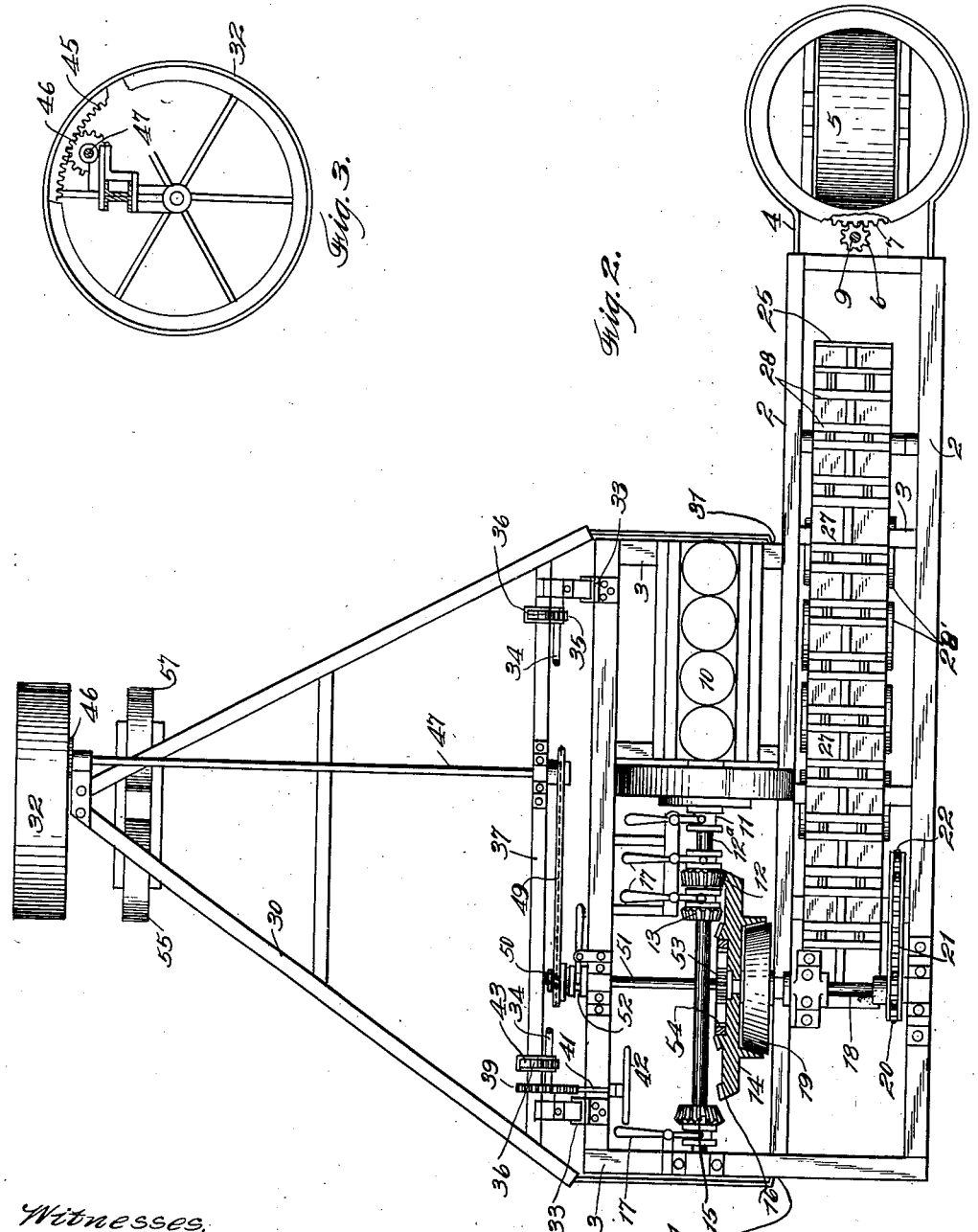

B. HOLT.
TRACTION ENGINE.
APPLICATION FILED DEC. 24, 1908.

945,538.

Patented Jan. 4, 1910.
3 SHEETS—SHEET 3.

Witnesses:
F. E. Maynard
J. Hasberg

Inventor,
Benjamin Holt,
By Geo. H. Strong.
his Atty.

UNITED STATES PATENT OFFICE.

BENJAMIN HOLT, OF STOCKTON, CALIFORNIA.

TRACTION-ENGINE.

945,538.  Specification of Letters Patent.  Patented Jan. 4, 1910.

Application filed December 24, 1908. Serial No. 469,043.

*To all whom it may concern:*

Be it known that I, BENJAMIN HOLT, citizen of the United States, residing at Stockton, in the county of San Joaquin and State of California, have invented new and useful Improvements in Traction-Engines, of which the following is a specification.

This invention relates to self-propelled vehicles, and pertains especially to traction engines.

It is the purpose of my invention to provide an improved side-hill traction engine, incorporating a single supporting traction member for the main frame; also to afford means whereby the machine may be successfully operated and turned upon either hilly or level ground; and further provides means for maintaining the main frame in an approximately level position.

Additional objects provided for, will be made apparent in the following specification.

The invention consists of the elements, the construction and combination of elements, or their equivalents, as shown in the accompanying drawings, in which—

Figure 1:
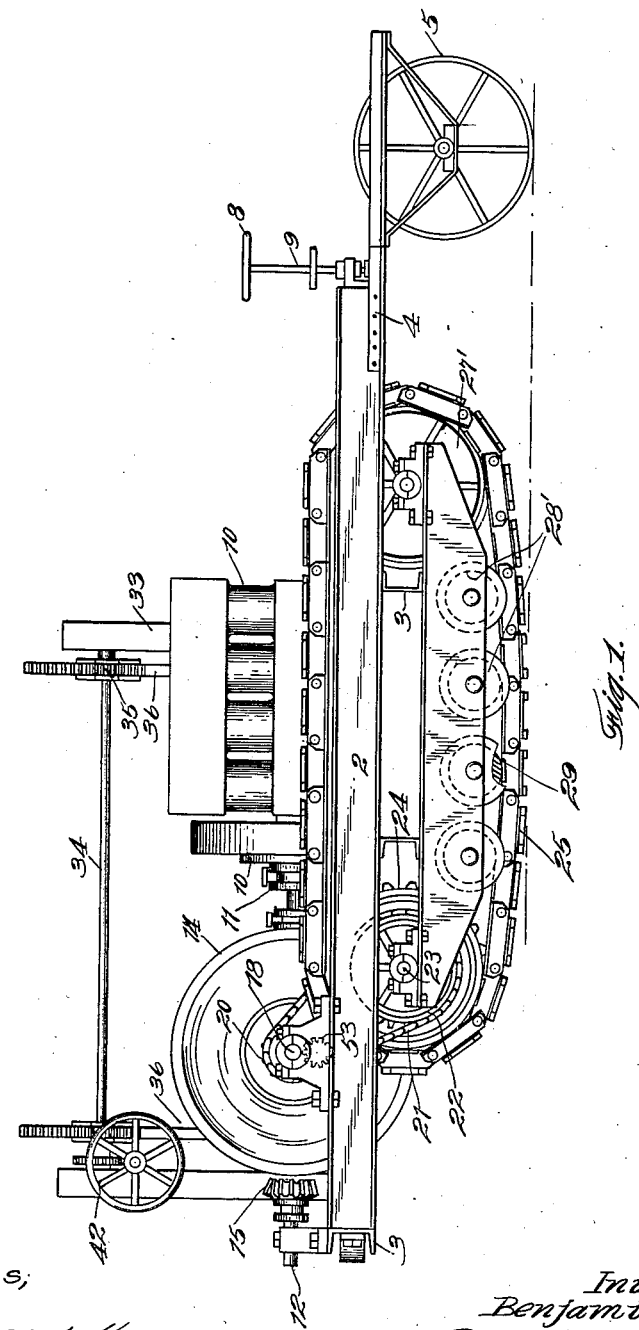
Figure 4:
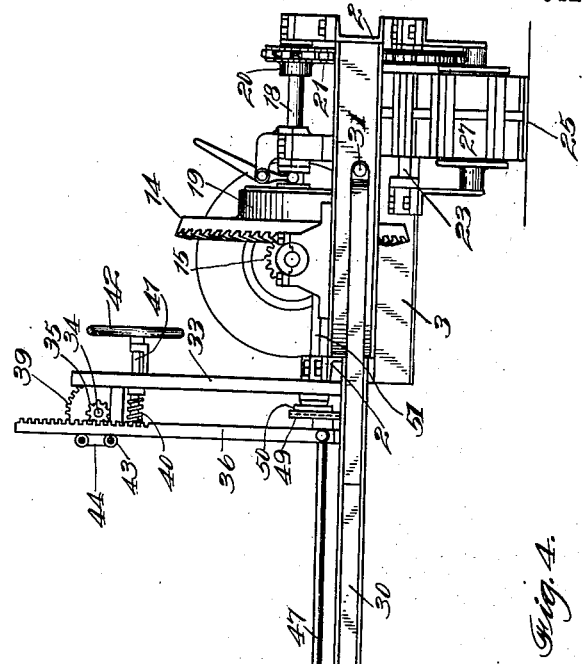
Figure 5:
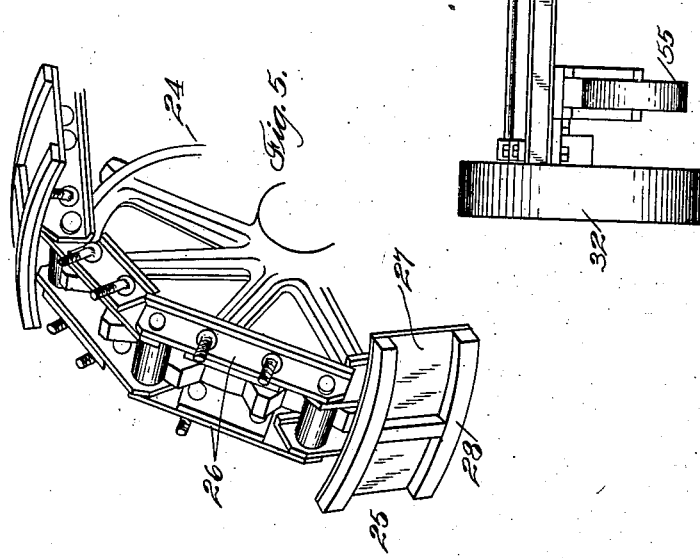

Figure 1 is a view of the right side of the traction engine. Fig. 2 is a plan view. Fig. 3 is a detail view showing the driving mechanism for the out-wheel. Fig. 4 is a rear view of the machine. Fig. 5 is a detailed perspective showing a portion of the traction member.

In an engine of this class, it is important to provide a structure possessing great rigidity, and yet of minimum weight, and it is also a desideratum to utilize the energy of the motor in the most efficient manner, and to accomplish this I have devised an engine as free from unnecessary power-consuming parts as expedient, and one in which the power of the motor is applied as directly to the driven members as is possible, and yet permit of speed-changing and reversing without reference to the motor. The construction also provides a single extended bearing and traction surface, of large area and superior efficiency.

Reference being had to the drawings, Figs. 1 and 2 illustrate the invention as comprising a main frame 2, preferably constructed of parallel channel iron members rigidly secured by suitable transverse beams 3, and having forwardly projecting brackets 4 adapted to support a turntable for a suitable steering-wheel 5, which may be turned as desired, by any suitable mechanism, such for instance as shown, comprising a pinion 6 engaging with teeth 7 of the turntable of the steering-wheel, and a hand-wheel 8 which is secured to the pinion 6 by means of a suitable shaft 9.

Some of the transverse members 3 are projected beyond one side of the frame 2, and carry a suitable motor 10, this motor being connected through a suitable clutch 11 to drive a main shaft $12^a$, upon which are mounted a plurality of slidable pinions 12—13 adapted to be inter-meshed with a master-gear 14 which, by means of the pinions 12 and 13, is caused to revolve at different speeds.

Another pinion 15 is mounted at the outer end of the main shaft 12, and adapted to be engaged and disengaged with the exterior set of teeth 16, upon the gear 14, for the purpose of reversing the direction of this gear.

Obviously, the several pinions just referred to, are actuated by respective levers 17 from which links may be extended to any convenient portion of the frame 2, so that the operator may have complete control over the transmission from a suitable platform not necessary here to be shown.

The gear 14 is loosely mounted upon the end of a transverse shaft 18 mounted in suitable journals secured to the frame 2, and upon this shaft is splined a clutch 19 which may be of any desirable construction, and which is adapted to be engaged and disengaged with the gear 14, and thereby rotate the shaft 18.

A sprocket-pinion 20 is rigidly secured upon the shaft 18, over which runs a sprocket-chain 21 which passes around a sprocket-wheel 22 secured upon the shaft 23 journaled beneath the main frame 2; this shaft 23 having secured upon it a large sprocket-wheel 24, the purpose of which is to propel the traction member 25. In the present instance this traction member comprises a series of parallel spaced linked chains 26 (Fig. 5), which have secured to their exterior edges, plates 27, and upon these plates 27 may be secured suitable traction members 28 which are adapted to travel and rest upon the ground.

The chain 25 is led forward from the gear 24 over an idler or direction pulley 27′, and returns below the frame over suitable supporting pulleys 28'. Preferably these pulleys are of such width that the flanges formed upon their ends overlap the sides of the chain 25, supporting this chain against transverse motion, and the interior surface of the chain 25 is supported upon the cylindrical body 29 of the rollers. There may be as many of these rollers provided as requisite, and I have shown the two outer rollers as mounted slightly higher than the lower central rollers. In this way the chain, as it travels around and from the forward pulleys 27', is led in a gentle incline or angle to the first pulley 28', and from thence to the slightly lower central pulleys, and travels between these two pulleys in an approximately horizontal position. Obviously, the area of the ground contact portion of the chain 25 may be increased or decreased at will by inserting any number of the pulleys 28' and by keeping the central pulleys in a horizontal plane, and slightly lower than the outermost pulleys. Since this traction member is essentially a single support for the vehicle, and is relatively narrow, thus adapting the machine to be propelled along sloping ground or hillsides, and since it is preferable to maintain the frame of the main machine in a horizontal position, I have provided an extension frame 30, which is pivoted as at 31, to the main frame 2. This extension frame, in the present instance, is shown as approximately triangular in shape, with its pivots proximate the base of the triangle, and is mounted upon the extended beams 3 of the frame. It has mounted at its outer end a runner or bearing-wheel 32.

To enable the machine to be successfully operated upon hillsides, and since the main traction member 25 is located to one side of the center of gravity of the engine frame, it is essential that the extension frame 30, which is pivoted to the main frame, be rigidly locked in any of the angular positions it may be caused to assume while traveling upon sloping ground, and for the purpose of accomplishing this locking of the two pivoted frames, I have shown uprights 33 secured to the frame 2, and these uprights are adapted to support a shaft 34 upon which are securely fastened suitable pinions 35 adapted to interlock with rack bars 36 pivotally secured to the cross-beam 37 of the extension frame 30. For the purpose of turning this shaft 34, I have secured upon it a worm-wheel 39 which is adapted to mesh with a worm 40 secured upon the shaft 41, to the end of which is fixed a hand-wheel 42 whereby the shaft and worm 41 may be operated either manually or by any suitable power connections with some portion of the transmission gear whereby the shaft 34 may be rotated, thus raising or lowering the rack bar 36 as the wheel 32 assumes a position either higher or lower than the ground level of the traction member 25.

In order to keep the rack bar 36 in intimate engagement with the pinion 35, a pair of idler rollers 43 are mounted upon plates 44 which are free to oscillate about the shaft 34 in accordance with the tilting motion of the rack bar 36.

For the purpose of accelerating and assisting in the running and turning of the machine, I have provided means whereby the out-wheel 32 may be driven; these comprising in the present instance an internal gear 45 formed upon the wheel 32 which engages with a pinion 46 secured upon a shaft 47 adapted to be driven by means of a chain 49 from sprocket-wheel 50 loosely mounted upon a short transverse shaft 51 journaled upon a main frame 2. The length of the chain 49, in its normal horizontal position and the loose or slack conditions in which such chains are run is sufficient to allow of the swinging movement necessary.

A clutch 52 is engageable and disengageable with the sprocket 50 enabling the operator to control at pleasure the out-wheel 32.

The innermost end of the shaft 51 has secured upon it a gear-pinion 53, this pinion being meshed with an internal gear 54 secured upon the master-gear 14. This pinion 53 is shown in dotted lines in Fig. 1, as being disposed below the axis of the main shaft of the machine 12 so as not to interfere with the proper operation of the transmission device.

Journaled upon the outer end of the frame 30, and near the bearing-wheel 32, are a plurality of auxiliary bearing-wheels 55. Preferably, these wheels are of smaller diameter than the wheel 32, and have their lower surfaces slightly elevated above the bottom of wheel 32, in such a fashion that when the larger wheel 32 is crossing a gulley or furrow in the ground, then the wheels 55 will come into bearing contact with higher sides of the gullies, and prevent the wheel 32 from pitching up and down at each furrow it traverses. This feature is of great advantage and value in countries where there is a heavy seasonal rainfall which causes frequent formation of washes and ruts.

The large area presented by the traction member 25 not only greatly increases the tractive efficiency, but being disposed longitudinally of the frame, and about in horizontal line with the load center, serves to keep the frame in level equilibrium just sufficient load being imposed upon the steering-wheel to give it steering purchase.

Having thus described my invention, what I claim and desire to secure by Letters Patent is—

1. In a traction engine, a main frame, a supplemental frame hinged to said main frame, means for adjusting and locking said frames relatively to each other, said means including a substantially vertical support from the main frame, a second support hinged to the supplemental frame and parallel to the first named support, an intermediate rack and pinion and locking devices, an endless traveling support for the main frame, a bearing-wheel for the supplemental frame, and mechanism by which either or both bearers may be driven.

2. In a traction engine, a main frame having a motor-carrying extension at one side, a single endless flexible longitudinally disposed driven support for the main frame having bearing rollers and located at one side of the center of gravity of the machine, a flexibly connected supplemental frame, a wheel support for said frame, means for transmitting power from the motor to the main bearer, and means to connect said transmitting devices to drive the supplemental wheel.

3. In a traction engine, a main frame and extension at one side, a motor carried on said extension, a flexibly hinged supplemental frame having a driven bearing wheel, means by which the outer end of the supplemental frame is vertically adjusted relative to the main frame, a single flexible endless traveling supporting platform disposed longitudinally beneath the main frame and forming an extended bearing to prevent the frame from tipping endwise, and means to lock the supplemental frame with relation to the main frame.

4. In a traction engine, a main frame, a single longitudinal traveling flexible platform support disposed beneath said frame, a rigid extension to one side of the main frame, a motor mounted upon said extension, means to transmit power from the motor to the traction member, a supplemental wheel-supported frame hinged to the main frame opposite to the extension, means for adjusting and locking said frames, and means to transmit power to independently drive the traveling platform and the supplemental wheel.

5. A traction engine comprising a main frame, a motor bearing extension of said frame, a flexibly connected supplemental side frame having adjusting and locking mechanism and a driven bearing-wheel at the outer end, a single flexible endless traveling platform longitudinally disposed beneath the main frame, a gear set, intermediate mechanism whereby power may be transmitted to drive the bearing members, and clutches to engage or release either of the driving mechanisms.

6. In a traction engine, a main frame, a single longitudinally traveling flexible platform support disposed beneath said frame, a rigid extension at one side of the main frame, a motor mounted upon said extension, means to transmit power from the motor to the traction member, means to maintain the stability of the structure, said means including a frame hinged to the main frame opposite to the motor bearing extension, and having a wheel at its outer end, mechanism to adjust and lock the supplemental frame with relation to the main frame, and clutch controlled mechanism to transmit power to drive the bearing-wheel of the supplemental frame.

7. A traction engine comprising a main frame, a rigid motor bearing extension of said frame, a flexibly connected supplemental side frame opposite to the extension, and having a bearing-wheel at its outer end, a transmission gear set, and a single flexible endless traveling platform longitudinally disposed beneath the main frame, a steering-wheel in front, means to adjust and lock the main and hinged frames, and mechanism by which power may be transmitted to drive the bearing members simultaneously or independently.

In testimony whereof I have hereunto set my hand in presence of two subscribing witnesses.

BENJAMIN HOLT.

Witnesses:
 GEO. H. STRONG,
 DAN. N. GILMORE.